Oct. 8, 1946.      J. C. A. CAMERON      2,409,103
AUTOMOBILE LUGGAGE CARRIER
Filed Aug. 17, 1943
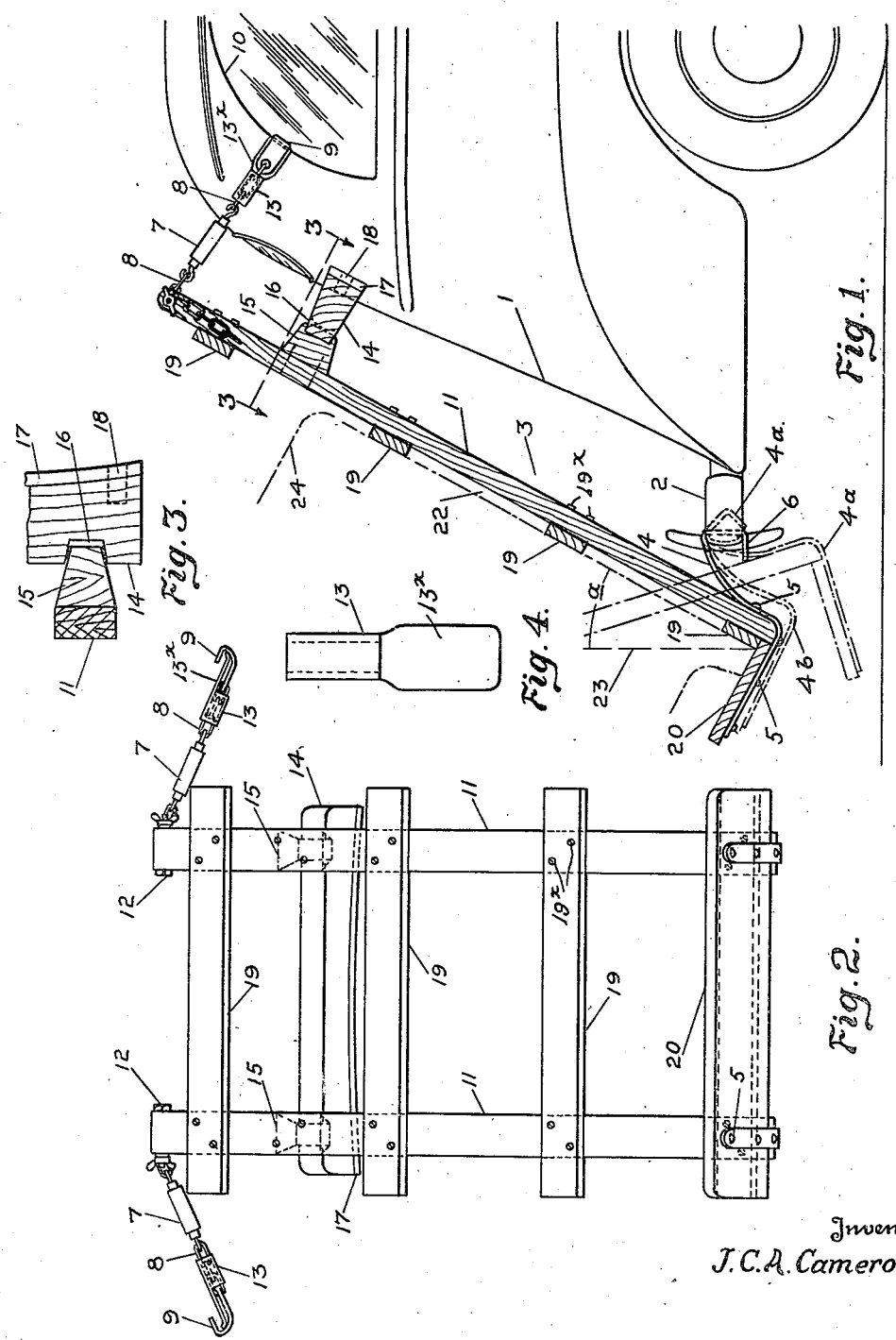
Inventor
J. C. A. Cameron.
By Albert E. Dieterich
Attorney Patented Oct. 8, 1946

2,409,103

UNITED STATES PATENT OFFICE 2,409,103

AUTOMOBILE LUGGAGE CARRIER

John C. A. Cameron, Washington, D. C.

Application August 17, 1943, Serial No. 498,963

3 Claims. (Cl. 224—29)

My invention relates to luggage carriers for use on an automobile of the coach or sedan type having a forwardly upwardly slanting back.

An object of the invention is to provide a simple, inexpensive carrier that can be constructed mainly of wood and can be so attached to the automobile that it will not mar the finish of the same.

Another object of the invention is to provide a luggage carrier for automobiles which can be easily and quickly attached and detached.

A further object is to provide a carrier of such construction as not to obstruct the driver's view through the rear window when the carrier is unloaded, or loaded with luggage, such as trunks and the like.

Generally, the invention comprises a frame, the weight of which and its load rests principally on the rear bumper of the machine and secondarily on the body of the vehicle.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a side elevation of the carrier attached to the rear end of an automobile.

Fig. 2 is a rear elevation of the carrier.

Fig. 3 is an enlarged section on the line 3—3 of Fig. 1.

Fig. 4 is an enlarged detail view of a buffer used under the chain and window hook.

In the drawing, in which like numbers of reference indicate like parts in all the figures, 1 indicates an automobile having a rear bumper 2 to which the carrier 3 is attached.

The carrier 3 comprises a pair of spring members 4 that are secured beneath the foot-board 20 of the carrier by rivets 5, or in any other suitable manner. Each member 4 is shaped as shown and has a hook-like end 6 that embraces the bumper and, when the carrier is in place, prevents accidental detachment of the carrier from the bumper.

The members 4, 6 are so constructed that they can be placed over the bumper 2, as indicated by the dot and dash lines 4a. From this position the carrier is moved to the position indicated at 4b, when the back and hook end 6 will contact the bumper and pass under the lower edge as shown. As the frame of the carrier is swung forward, the members 4 assume the full-line position, as shown in Fig. 1, to which position they are drawn by the turnbuckles 7 interposed between chain links 8. One end of each chain is attached to a hook 9 which is so constructed as to hook in the car window 10. The other part of each chain extending from the turnbuckle may have sufficient links to meet varied conditions, and is secured to the uprights 11 of the carrier 3 by the bolts 12 fitted with butterfly nuts. The excess of the chain links 8 may be lashed to the uprights 11. By the use of the turnbuckles 7 the carrier is drawn into the fixed position which will extend the spring hooks, to some extent, and draw back the hooks 6 tight against the bumper 2.

The portions of the chains 8 which are attached to the hooks 9 are covered with pieces of rubber hose (or hose made of other suitable material), as shown in Figs. 1, 2 and 4, the hose being cut to provide flat portions 13x that lie under the hooks (see Fig. 1). These pieces of hose act as buffers for both chains and hooks to prevent damaging the finish of the car.

At the places where the uprights 11 would contact the car, they are fitted with variable members 15, secured to the uprights 11. These members 15 make contact with a bar 14 in grooves 16 on a convex surface to allow some variation in angle between cross-bar 14 and members 15. Thus the members or blocks 15 will be variable to meet the different angles on the various makes of cars. The members 15 may be secured to the uprights by screws, as indicated in the drawing, or by other suitable means.

The bearing bar 14 has a wide portion fitted to and contacting the car surface so as to distribute the load thereon over an extensive area, a heavy felt pad 17 being provided between the bar 14 and the automobile.

The bar 14 also is preferably provided with two recesses which may be made to contain suction cups 18 of rubber or other suitable material to hold the bar 14 in place while the carrier is being secured to the car.

The uprights 11 are further fitted on the rear faces 22 with a plurality of cross arms 19 that extend somewhat over the sides of the uprights, so that they may be used to support the equipment to be carried, and also for the lashing ropes to secure said equipment. The cross arms 19 are preferably secured to the uprights 11 in a permanent manner by any approved means, such as by screw bolts 19x having the bolts riveted over the nuts after assembling.

The uprights 11 are further fitted with a foot-board 20 which is secured to the spring members 4 and to the uprights by the rivets 5.

In practice, I preferably make the spring members 4 of 3/8" by 1½" spring steel; the uprights of 2" by 4" lumber; the cross arms of 1" by 4" lumber about 40" long (the uprights 11 being about 32" apart); and the foot-board 1" by 10" by 40".

The equipment to be carried is placed on the foot-board, as indicated by dot and dash lines 24, in the position shown. The cross arms may accommodate any unevenness in the equipment, when required. The angle $a$ of the carrier should not be too great—say not over 30 degrees—so as to allow the greater part of the weight to be carried by the spring members 4 and the bumper 2.

The center of gravity of the equipment carried should be slightly forward of the line 23. The carrier shown and described will carry equipment 24 whose dimensions do not greatly exceed 36" by 36" by 72", and which does not weigh over 400 pounds.

Properly constructed, the carrier will not rattle when empty or loaded, and will in no way damage the car.

While the carrier is preferably made of wood, it may be constructed of metal or suitable plastics, and I do not wish to be limited to the use of any particular material in the construction of my device.

From the foregoing description, taken in connection with the accompanying drawing, it is thought that the construction, operation and advantages of the invention will be clear to those skilled in the art.

What I claim is:

1. An automobile luggage carrier which includes: a frame composed of uprights connected by cross arms; a foot-board at the bottom of said frame; shock-absorbing leaf spring members, one end of each leaf-spring member being secured to the lower part of the frame and extending upwardly from the same, the other end of each leaf-spring member being formed into a hook to hook over and under the rear bumper of an automobile; blocks secured to said uprights; a bar shaped to fit crosswise of the back of the automobile and having portions engaged by said blocks with rolling contact; and means to connect the upper part of the frame with the side windows of the automobile.

2. In a luggage carrier for automobiles, the improvement which comprises a frame composed of a pair of uprights and cross arms and a foot-board secured together, a pair of leaf-springs secured to said frame and extending upwardly-forwardly from the bottom of the same and terminating in bumper-embracing hook ends, variable blocks secured to the uprights near their upper ends, a cross bar shaped to fit against the back of the automobile below the rear window of the same and having grooves to receive said blocks, and means to anchor the upper end of the frame to the automobile.

3. In a luggage carrier for automobiles, the improvement which comprises a frame composed of a pair of uprights and cross arms and a foot-board secured together, a pair of leaf-springs secured to said frame and extending upwardly-forwardly from the bottom of the same and terminating in bumper-embracing hook ends, variable blocks secured to the uprights near their upper ends, a cross bar shaped to fit against the back of the automobile below the rear window of the same and having grooves to receive said blocks, means to hold said cross bar in place while the frame is being placed on the vehicle, and means to anchor the upper end of said frame to the body of the automobile.

JOHN C. A. CAMERON.